(12) United States Patent
Klos et al.

(10) Patent No.: US 7,200,637 B2
(45) Date of Patent: Apr. 3, 2007

(54) SYSTEM FOR PROCESSING ELECTRONIC MAIL MESSAGES WITH SPECIALLY ENCODED ADDRESSES

(76) Inventors: Thomas John Klos, 292 N. Wyoming Ave., N. Massapequa, NY (US) 11758; D. Suzanne Moore, 460 Larkspur Dr., Kennett Square, PA (US) 19348

( * ) Notice: Subject to any disclaimer, the term of this patent is extended or adjusted under 35 U.S.C. 154(b) by 635 days.

(21) Appl. No.: 10/620,667

(22) Filed: Jul. 16, 2003

(65) Prior Publication Data

US 2005/0015449 A1    Jan. 20, 2005

(51) Int. Cl.
*H04L 9/00* (2006.01)
*G06F 15/16* (2006.01)

(52) U.S. Cl. .................. 709/206; 709/224; 713/207
(58) Field of Classification Search ......... 709/206, 709/207, 245
See application file for complete search history.

(56) References Cited

U.S. PATENT DOCUMENTS

| | | | |
|---|---|---|---|
| 5,822,526 A | 10/1998 | Waskiewicz | |
| 5,944,787 A * | 8/1999 | Zoken | ................. 709/206 |
| 6,249,805 B1 | 6/2001 | Fleming, III | |
| 6,266,692 B1 | 7/2001 | Greenstein | |
| 6,301,608 B1 | 10/2001 | Rochkind | |
| 6,330,590 B1 | 12/2001 | Cotten | |
| 6,381,634 B1 | 4/2002 | Tello | |
| 6,393,463 B1 | 5/2002 | Fuchigami | |
| 6,393,464 B1 | 5/2002 | Dieterman | |
| 6,421,709 B1 | 7/2002 | McCormick | |
| 6,453,327 B1 | 9/2002 | Nielsen | |
| 6,804,336 B2 * | 10/2004 | Chiu | ................. 379/100.08 |
| 2003/0191969 A1 * | 10/2003 | Katsikas | ................. 713/201 |
| 2003/0229632 A1 * | 12/2003 | Harris | ................. 707/3 |
| 2004/0044791 A1 * | 3/2004 | Pouzzner | ................. 709/245 |
| 2004/0068543 A1 * | 4/2004 | Seifert | ................. 709/206 |
| 2004/0250119 A1 * | 12/2004 | Shelest et al. | ................. 713/201 |

OTHER PUBLICATIONS

P. Resnick (editor), RFC2822, Apr. 2001, http://www.faqs.org/rfcs/rfc2822.html.
W. Lazear, RFC 1031, Nov. 1987, http://www.faqs.org/rfcs/rfc1031.html.
M. Stahl, RFC 1032, Nov. 1987, http://www.faqs.org/rfcs/rfc1032.html.
M. Mockapetris, RFC 1034, Nov. 1987, http://www.faqs.org/rfcs/rfc1034.html.
M. Mockapetris, RFC 1035, Nov. 1987, http://www.faqs.org/rfcs/rfc1035.html.
J. Klensin (editor), RFC 2821, Apr. 2001, http://www.faqs.org/rfcs/rfc2821.html.

* cited by examiner

*Primary Examiner*—Jeffrey Pwu
(74) *Attorney, Agent, or Firm*—SonnabendLaw; Jeffrey Sonnabend (57) ABSTRACT

A method for processing an electronic mail message is disclosed comprising the steps of: accepting a request for e-mail server address information for an electronic message having an address, the address having an electronic mail receiving system domain with a recipient name encoded therein; providing an e-mail server address for the recipient name in response to the request; accepting the electronic message at the e-mail server address.

3 Claims, 6 Drawing Sheets

```
brian@johndoe.xyzcompany.com         johndoe
ebay.com@johndoe.xyzcompany.com      johndoe
hotels.com@johndoe.xyzcompany.com    error:nouser email to this address is blocked
jay@johndoe.xyzcompany.com           johndoe
jeff@johndoe.xyzcompany.com          johndoe
joe@johndoe.xyzcompany.com           johndoe
kelly@johndoe.xyzcompany.com         johndoe
lockergnome.com@johndoe.xyzcompany.com  johndoe
Mary.Shomon@johndoe.xyzcompany.com   johndoe
paypal.com@johndoe.xyzcompany.com    johndoe
riddler@johndoe.xyzcompany.com       error:nouser user not found
tj@johndoe.xyzcompany.com            johndoe
*@johndoe.xyzcompany.com             error:nouser user not found
```

SYSTEM FOR PROCESSING ELECTRONIC MAIL MESSAGES WITH SPECIALLY ENCODED ADDRESSES

BACKGROUND OF THE INVENTION

1. Field of the Invention

The present invention relates generally to the field of electronic mail systems, and more specifically to the field of computer network electronic mail systems such as electronic mail transmitted via the internet. The present invention further relates to the field of electronic mail host systems.

2. Background of the Related Art

As the use of electronic messaging ("e-mail") such as e-mail transmitted via the Internet grows, the need for improved control mechanisms for users and system administrators also grows. Among other desired controls, it is increasingly important to provide users and system administrators with adequate tools for addressing issues relating to unsolicited commercial e-mail, commonly referred to as "spam".

E-Mail Addressing

Electronic messages must be properly addressed in order for electronic mail systems to route such messages to the desired recipient. Just as with conventional postal mail, a message's address must be sufficient to identify the intended destination and recipient at that location. Generally, this is accomplished in the electronic mail context by specifying the intended recipient's name (sometimes called a "user name") and network location (sometimes called a "domain", "mail server domain" or "mail system domain"). So long as the recipient name is unique at the specified network location, and the specified network location is unique within the network as a whole, the message will be adequately addressed.

In the context of the Internet, the addressing and transmission of e-mail is governed by a series of standards, often called "RFCs". One such RFC, entitled "Internet Message Format" and denominated RFC2822, incorporated herein by reference, specifies the addressing format for e-mail messages carried via the Internet and is the generally accepted standard for e-mail addressing on the Internet. Addresses adhering to RFC2822 generally speaking have two sections that are separated by the symbol "@".

The section to the right of the "@" symbol is generally referred to as the "domain" of the address and identifies the network location to which the mail is to be delivered, that is, the particular mail server or host which is to receive the e-mail message. A domain may consist of one or more sub-domains, usually with a minimum of one sub-domain. Each sub-domain represents a subpart of the domain to which it belongs. For example, the domain "xyzcompany.com" has two domain parts, "xyzcompany" and "com". Thus, "xyzcompany.com" is a sub-domain, i.e., a subpart, of the "com" domain. Similarly, the domain "mail.xyzcompany.com" has three domain parts, and "mail.xyzcompany.com" is a sub-domain of "xyzcompany.com", which in turn is a sub-domain of "com".

Each domain and sub-domain represents a computer understandable address which permits routing of information, including e-mail, through a computer network to the domain, as is more fully described in RFC1031 and RFC1032, incorporated herein by reference. The relationship between domains and addresses is well understood by those of ordinary skill in the art.

The section to the left of the "@" symbol is generally referred to as the "local-part" of the address, or more informally, the "recipient" or "user name". Normally, the local-part of an address is interpreted on the particular host as a name of a particular user. Each user name within a specified domain must be unique to avoid ambiguities in e-mail addressing.

Normally, no information beyond the user name and domain are included in the address of an e-mail message. The Internet standard published in RFC2822 does not provide for any additional information to be included in the address field; that is, RFC2822 provides that only the recipient name and e-mail system domain are included in the address field of a compliant e-mail message. Thus, where a user desires to process incoming e-mail messages, for example, to block unwanted unsolicited commercial e-mail, the incoming e-mail address has been a largely unsuitable parameter for use in connection with such processing.

Control of Unsolicited Commercial E-Mail

Unsolicited commercial e-mail, when received in large quantities, often bogs-down e-mail systems during the processing and routing of e-mail messages and occupies large volumes of storage resources. Additionally, large volumes of unsolicited commercial e-mail require users to review and discard large amounts of unwanted e-mails when reviewing newly received e-mail. This negatively impacts businesses in particular by greatly reducing the efficiency of the workforce.

Several purported solutions to the foregoing problems have been suggested. Each has significant shortcomings, however, rendering it undesirable or inadequate.

One broad class of suggested solutions attempts to filter incoming e-mail by application of quasi-intelligent analysis using various heuristic methods. For example, U.S. Pat. No. 6,330,590 discloses a method for filtering unsolicited e-mail by examining a stream of e-mail messages for repeated identical messages addressed to different recipients. Such messages are presumed heuristically to be unsolicited commercial e-mail, and are flagged by the system as such, thereby permitting the messages to be filtered and/or blocked.

Similarly, U.S. Pat. No. 6,393,465 discloses in part a junk mail detector and eliminator which examines e-mail routing history to determine heuristically whether a particular e-mail is unsolicited and therefore should be blocked. Other heuristic filters examine various aspects of incoming e-mail messages and apply content-based heuristics to determine whether a particular e-mail message is likely to be unsolicited commercial e-mail. An example of this type of heuristic tool may be found at http://eu.spamassassin.org/index.html, which analyzes, among other elements, sender and recipient headers, subject headers and message body contents.

Systems relying on heuristic filtering of e-mail messages require sophisticated, time consuming human-based analysis of a large number of unsolicited e-mail messages to determine what, if any, common attributes may exist among such messages. Once the analysis is accomplished, if it is accomplished effectively at all, systems must perform extensive analysis on a wide range of aspects of each and every e-mail message arriving at an e-mail server. As senders of unsolicited commercial e-mail learn through experience what attributes are leading to rejection of their sent messages, they will be motivated to alter the attributes of their messages to avoid the application of the heuristic rules, in turn motivating the creation of new heuristic rules, thereby setting off an inefficient cycle of counter-measure development on both sides. Additionally, heuristic methods by their nature apply broad, generalized rules, thereby making the possibility of "false positives", i.e., the incorrect classification of legitimate e-mail as unsolicited commercial e-mail, a real possibility. These shortcomings render heuristic filtering an undesirable solution to the aforementioned problems.

Another class of suggested solutions requires senders of e-mail, or their e-mail systems, to interact with the recipient's e-mail system in order to verify that the sender is not merely an automated mass-mail system. For example, U.S. Pat. No. 6,393,465, discussed previously, discloses in part a system wherein an e-mail system for a recipient attempts to contact the purported sender in order to verify that the identified host computer actually exists and accepts outgoing mail services for the specified sender. Failure of this verification step would result in flagging the message at issue as unwanted or unsolicited e-mail. Such solutions are undesirable, as they require affirmative action on the part of e-mail senders, which senders may resist.

Yet another class of suggested solutions rely on specific information to be included as part of the e-mail message being sent. One example of such a proposed solution is U.S. Pat. No. 6,266,692, which discloses a method for blocking unsolicited commercial e-mail using a header-based password. In this solution, a user must provide a "passcode" to all potential senders of e-mail messages and must further maintain a list of valid "passcodes". Senders of e-mail to the user would then be required to insert the "passcode" into such e-mail messages in an additional header field of the message. This proposed solution is undesirable, however, because it requires e-mail senders to insert information in e-mail messages which is not included in current internet e-mail standards and protocols, and so may not be implemented in presently available e-mail composition (i.e., e-mail client) applications.

Still another class of suggested solutions relies on filter rules implemented in whole or in part by end-user recipients of the messages. Included in this class of solutions are those which rely on so called "white list" and/or "black list" of senders, wherein senders included on the former list are always shown to the user while those on the latter list are always blocked. One example of such a system is disclosed by U.S. Pat. No. 6,393,464, which teaches in part a system that utilizes a list of allowed electronic addresses with whom the user is permitted to freely exchange messages. Each message sent by or sent to the user is categorized as either authorized if the other party to the communication appears on the allowed list, or unauthorized if the other party does not appear on the allowed list. This class requires that users actively maintain lists of senders of e-mail messages and may not provide default processing for received c-mail from senders found on neither the "white list" nor "black list". Additionally, users of such a system cannot readily change e-mail addresses provided to others when such addresses become overwhelmed with unsolicited commercial e-mail. Once a user's e-mail address is publicly known, such a user would have to wholly change its address in order to block incoming e-mail, potentially requiring the user to notify large numbers of correspondents of the change in address.

A related class of solutions is the so called "collaborative filter", an example of which is disclosed in part in U.S. Pat. No. 6,421,709. There, end-users of a common e-mail system, such as that of an internet service provider, report to a centralized filtering system when messages considered to be unsolicited commercial e-mail are received by an end-user. Thereafter, the centralized system uses heuristic rules to determine whether to block future instances of such messages from reaching other users of the e-mail system. This class of solution is prone to abuses by groups of users who for illegitimate purposes desire that certain messages, or messages from certain senders, be blocked for all users of the common filter. Furthermore, such systems do not permit the easy management of e-mail addresses for individual users.

With these considerations in mind, it is desirable to have an electronic message management system which readily facilitates the blocking of unwanted unsolicited commercial e-mail without requiring non-standard extensions to current electronic mail standards and protocols. Furthermore, it is desirable to have an electronic message management system which permits the efficient creation and deletion of e-mail addresses for individual users.

SUMMARY OF THE INVENTION

The subject invention is directed to a new and useful electronic mail system which permits end users to quickly add and remove valid incoming addresses associated with the user, thereby affording the user a great degree of control in blocking undesired e-mail, including unwanted unsolicited commercial e-mail.

One preferred embodiment of the present invention includes a method for processing an electronic mail message comprising the steps of receiving in an electronic mail receiving system an electronic message having an address, the address having an electronic mail receiving system domain with a recipient name encoded therein, and processing the electronic message in accordance with processing instructions associated with the recipient name. The recipient name may be a sub-domain of the electronic mail receiving system domain and the processing step may include the step of processing the sub-domain. Also, the processing may include the step of routing the electronic message to an e-mail server associated with the recipient name. The recipient name may include the end user or other intended recipient of the message.

Another embodiment of the present invention discloses a method for processing an electronic mail message comprising the steps of: accepting a request for e-mail server address information for an electronic message having an address, where the address has an electronic mail receiving system domain with a recipient name encoded therein; providing an e-mail server address for the recipient name in response to the request; and accepting the electronic message at the e-mail server address. In this embodiment, the recipient name may be a sub-domain of the electronic mail receiving system domain, and the step of providing an e-mail server address may include the steps of obtaining sub-domain address information for the sub-domain of the electronic mail receiving system domain and providing the sub-domain address as the e-mail server address. This step of obtaining the sub-domain address information in this embodiment may include the steps of requesting an address from a DNS server and receiving a sub-domain address from the DNS server in response to the request.

The address of the mail message in the above embodiments may include a source identifier, and the method may have the further steps of examining the source identifier included in the address and processing the electronic message based on processing instructions associated with the source identifier. The address may include a local-part, and the source identifier may be encoded in the local-part, in which case the step of examining the source identifier may include the step of retrieving the source identifier from the local-part of the address. Retrieving the source identifier may include any method whereby the source identifier is read, streamed or otherwise accessed such that subsequent processing based on the source identifier may occur.

The aforementioned step of processing the electronic message may include the steps of: opening a database; determining if an entry associated with the source identifier exists in the database; and, if the entry exists, processing the electronic message in accordance with processing instructions contained in the entry, or, if the entry does not exist, processing the electronic message in accordance with a default processing instruction. The recipient name may be a sub-domain of the electronic mail receiving system domain in this embodiment, and the step of providing an e-mail server address may include the steps of obtaining sub-domain address information for the sub-domain of the electronic mail receiving system domain and providing the sub-domain address as the e-mail server address. The step of obtaining the sub-domain address information may include the steps of requesting an address from a DNS server and receiving a sub-domain address from the DNS server in response to the request.

Another preferred embodiment of the present invention includes a system for receiving and processing an electronic message utilizing substantially the same methods just discussed. The system includes an electronic message receiver for receiving an incoming electronic message, where the message has an address which includes an electronic mail receiving system domain portion having a recipient name encoded therein; an electronic mail receiving system domain associated with the system; processing instruction storage for maintaining processing instructions for the incoming electronic message based on the recipient name; a message processor for processing the incoming electronic message in accordance with the processing instructions. The recipient name may be a sub-domain of the electronic mail receiving system domain, and the processing instruction storage may include instructions associated with the sub-domain. Furthermore, the system may include an e-mail server associated with the recipient name, and the message processor may include an e-mail server address request processor for providing e-mail server address information in response to a request for an e-mail server address associated with the recipient name. The name may be a sub-domain of the electronic mail receiving system domain, and the e-mail server address request processor may be a DNS server.

In the foregoing embodiments, the address of the electronic messages may include a local-part and a source identifier encoded in the local-part, and the e-mail server may include process instruction storage for maintaining processing instructions based on the source identifier for electronic messages received by the e-mail server. The e-mail server may have an electronic message processor for processing electronic messages received by the e-mail server in accordance with the processing instructions. The instruction storage may be a database or a text database.

These and other aspects of the subject invention will become more readily apparent to those having ordinary skill in the art from the following detailed description of the invention taken in conjunction with the drawings described herein.

BRIEF DESCRIPTION OF THE DRAWINGS

So that those having ordinary skill in the art to which the subject invention pertains will more readily understand how to make and use the subject invention, preferred embodiments thereof will be described in detail herein with reference to the drawings.

DETAILED DESCRIPTION OF THE PREFERRED EMBODIMENTS

The present invention presents a novel approach to e-mail message management and is particularly adaptable for the filtering, blocking and processing of unsolicited commercial e-mail. In particular, the present invention allows e-mail recipient information to be included with e-mail domain information, and a source identifier linked to one or more particular e-mail senders may be included in local-part address information. The present invention further allows end users to quickly create and destroy source identifiers, thereby permitting the ad-hoc creation and destruction of valid e-mail addresses. Furthermore, the present invention readily permits the management of sender rights and processing directives associated with source identifiers, allowing efficient management of incoming e-mail messages.

Figure 1:
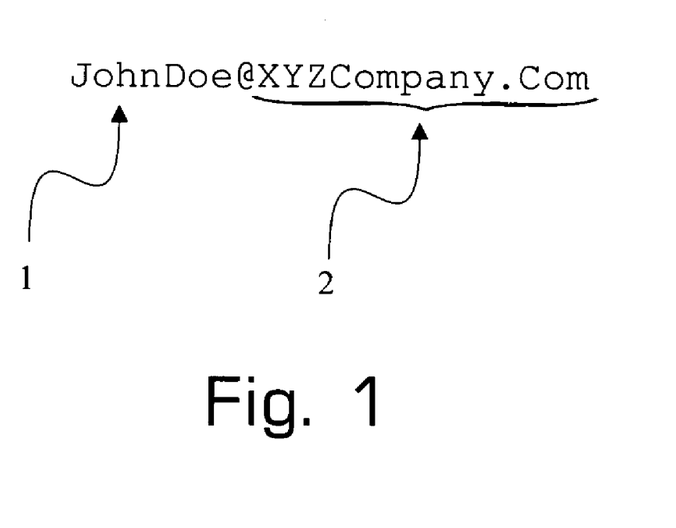
FIG. 1 is an RFC2822 adherent e-mail address that is not encoded in accordance with the present invention.
Figure 2:
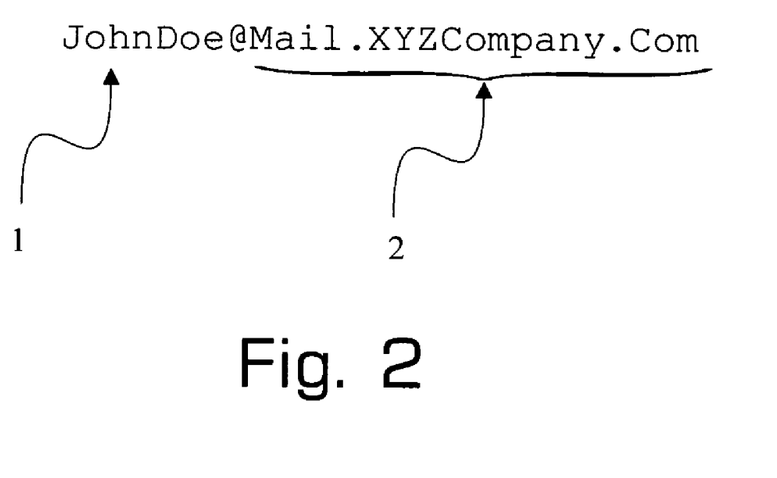
FIG. 2 is an RFC2822 adherent e-mail address containing an additional mail server sub-domain that is not encoded in accordance with the present invention.

In certain preferred embodiments of the present invention, e-mail addresses adhere to RFC2822. FIG. 1 depicts an e-mail address which adheres to RFC2822 but which is not encoded in accordance with the present invention. Local-part 1, representing the recipient's user name, appears to the left of the "@" while the mail server domain 2 appears to the right of the "@" symbol. Likewise, FIG. 2 depicts another e-mail address which adheres to RFC2822 but which is not encoded in accordance with the present invention. Here, local-part 1 appears to the left of the "169 " symbol as in FIG. 1, but mail server domain 2 includes an additional sub-domain when compared to the mail server domain depicted in FIG. 1. In both FIGS. 1 and 2, the recipient is identified by local-part 1 and the mail server domain where the recipient is located is identified by mail server domain 2.

Figure 3:
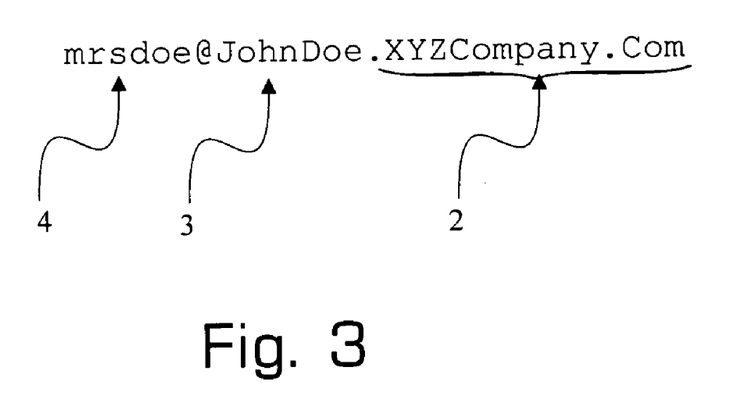
FIG. 3 is an RFC2822 adherent e-mail address that is encoded in accordance with the present invention.
Figure 4:
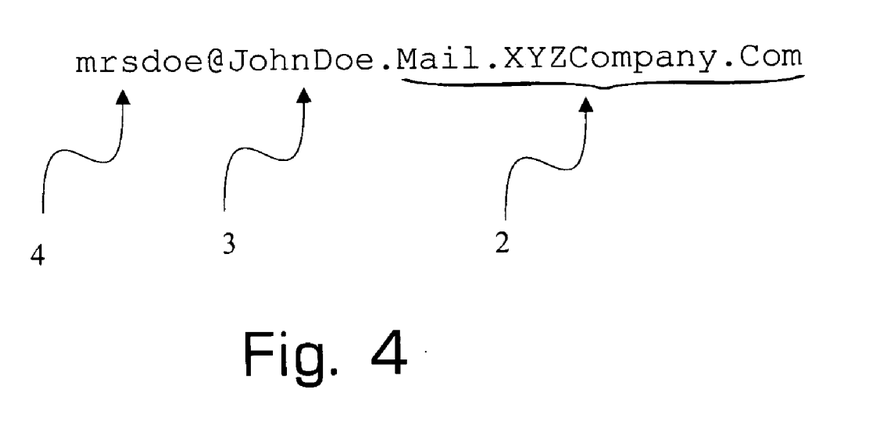
FIG. 4 is an RFC2822 adherent e-mail address containing an additional mail server sub-domain, similar to that depicted in FIG. 2, that is encoded in accordance with the present invention.

By contrast, FIG. 3 depicts an RFC2822 adherent e-mail address encoded in accordance with a preferred embodiment of the present invention. In this embodiment, the recipient information, which may be a user name, is coded as a sub-domain 3 of the mail server domain 2, which is located on the right of the "169 " symbol. Mail server domain 2 corresponds to mail server domain 2 of FIG. 1, while the recipient encoded as sub-domain 3 corresponds to the recipient identified by local-part 1 of FIG. 1. In this embodiment, the left side of the "169 " symbol, which, as in FIG. 1, normally contains the local-part of the address corresponding to the intended message recipient, contains instead source identifier 4. In a similar fashion, FIG. 4 depicts an RFC2822 adherent e-mail address in accordance with the present invention which contains an additional mail server sub-domain similar to that depicted in FIG. 2. As in the address depicted in FIG. 3, the recipient information appears as a sub-domain 3 located to the right of the "169" symbol, while the left side of the "169" symbol contains source identifier 4.

Because recipient information is included with the domain information in the instant invention, the local-part of an address may be used for other purposes, or may be disregarded completely for delivery purposes. More particularly, end-users may readily assign one or more source identifiers to particular senders of e-mail on an ad-hoc basis, thereby allowing the recipient to identify the sender of any received message by referencing the source identifier contained in the local-part of the address. Likewise, because local-part information is not required to uniquely identify a user on a particular e-mail system, unknown or pre-selected local-parts may be ignored without preventing the receiving e-mail system from successfully delivering such e-mail messages to the proper user.

The following example illustrates some of the foregoing features of the present invention. An end-user named John Doe may have a mailbox at the domain "mail.xyzcorp.com". In implementations not embodying the present invention, this user's address may be "johndoe@mail.xyzcorp.com", "jdoe@mail.xyzcorp.com" or the like. In this case, the user would be limited to providing all senders of e-mail the single address which he had been assigned, namely "johndoe@mail.xyzcorp.com", "jdoe@mail.xyzcorp.com", or the like. All senders of e-mail to John Doe would necessarily use this common address. Sender-specific addresses for sending e-mail to John Doe would not be available for different senders.

Alternatively, if an embodiment of the present invention were employed, John Doe's e-mail address would be uniquely defined by the domain "johndoe.mail.xyzcorp.com" or the like. As a result, John Doe would free to assign distinct source identifiers to different senders of e-mail messages by utilizing the local-part of the address. Thus Mrs. Doe may be assigned the source identifier "mrsdoe", resulting in an RFC2822 compliant address of "mrsdoe@johndoe.mail.xyzcorp.com". Likewise, John Doe's clients may each have a different source identifier, such as "client1" or "abccorp", resulting in RFC2822 compliant addresses of "client1@johndoe.mail.xyzcorp.com" and "abccorp@johndoe.mail.xyzcorp.com" respectively.

Table 1 provides further illustrative examples of the use of sender-specific source identifiers in accordance with the present invention.

TABLE 1

| Address | End-User Assignment |
| --- | --- |
| newsletter.myclub.com@johndoe.mail.xyzcorp.com | Assigned to sender of news letter on www.myclub.com. |
| forecast.weather.com@johndoe.mail.Xyzcorp.com | Assigned to sender of daily weather forecast. |
| 49266255278@johndoe.mail.xyzcorp.com | Assigned to bank for sending bank statements for account 49266255278. |
| 291gk.gew34@johndoe.mail.xyzcorp.com | Assigned to a sender using a source identifier comprised of random letters and numbers to avoid sender guessing other valid source identifiers. |

Furthermore, because John Doe is completely identified as the intended recipient for all mail sent to "johndoe.mail.xyzcorp.com" regardless of local-part/source identifier, incoming messages with invalid or missing local-parts/source identifiers could still be properly delivered to John Doe, or otherwise processed on behalf of John Doe, as appropriate. For example, John Doe might specify that all e-mail sent to him with invalid source identifiers be scanned by heuristic filters to determine if the message is likely to be unsolicited commercial e-mail, or John Doe may simply choose to have the e-mail system reject all e-mail lacking a valid source identifier.

Additionally, the end-user may readily maintain control over the creation and destruction of valid source identifiers, thereby limiting or otherwise controlling the flow of e-mail to the end-user. For example, when signing-up for an electronically distributed newsletter, a user may create a new source identifier such as "mynewsletter" to be given to the newsletter distributor, resulting in the RFC2822 compliant address "mynewsletter@johndoe.mail.xyzcorp.com". If at some subsequent time the user either no longer desires to receive such newsletter, or if the address "mynewsletter@johndoe.mail.xyzcorp.com" begins receiving excessive unsolicited commercial e-mail, the user may simply remove the source identifier "mynewsletter" from the list of valid source identifiers, thereby rendering the address "mynewsletter@johndoe.mail.xyzcorp.com" unusable. This alteration would not affect any other e-mail address used by other senders, allowing the user to readily maintain "welcome" and "unwelcome" lists of source identifiers.

Other e-mail sorting and processing may also be done on incoming e-mail messages based on source identifiers of such incoming messages. For example, based on incoming messages' source identifiers, users may: route messages to specific mailboxes within the recipients e-mail system; assign certain priorities such as "high priority" and the like to messages; automatically reply to messages; apply translations and other text processing to message bodies; encrypt and/or decrypt messages; route messages to specific applications or forward messages to other recipients. Any sorting and processing of messages may be done based on incoming mail source identifiers, as those of skill in the art will readily recognize.

To implement a preferred embodiment of the present invention in the context of an Internet e-mail system, an e-mail system administrator modifies both the domain name system server (the "DNS server"), as disclosed in RFC1034 and RFC1035, incorporated herein by reference, and the e-mail server, as disclosed in RFC2821, incorporated herein by reference, for the e-mail receiving system implementing the present invention.

Figure 5:
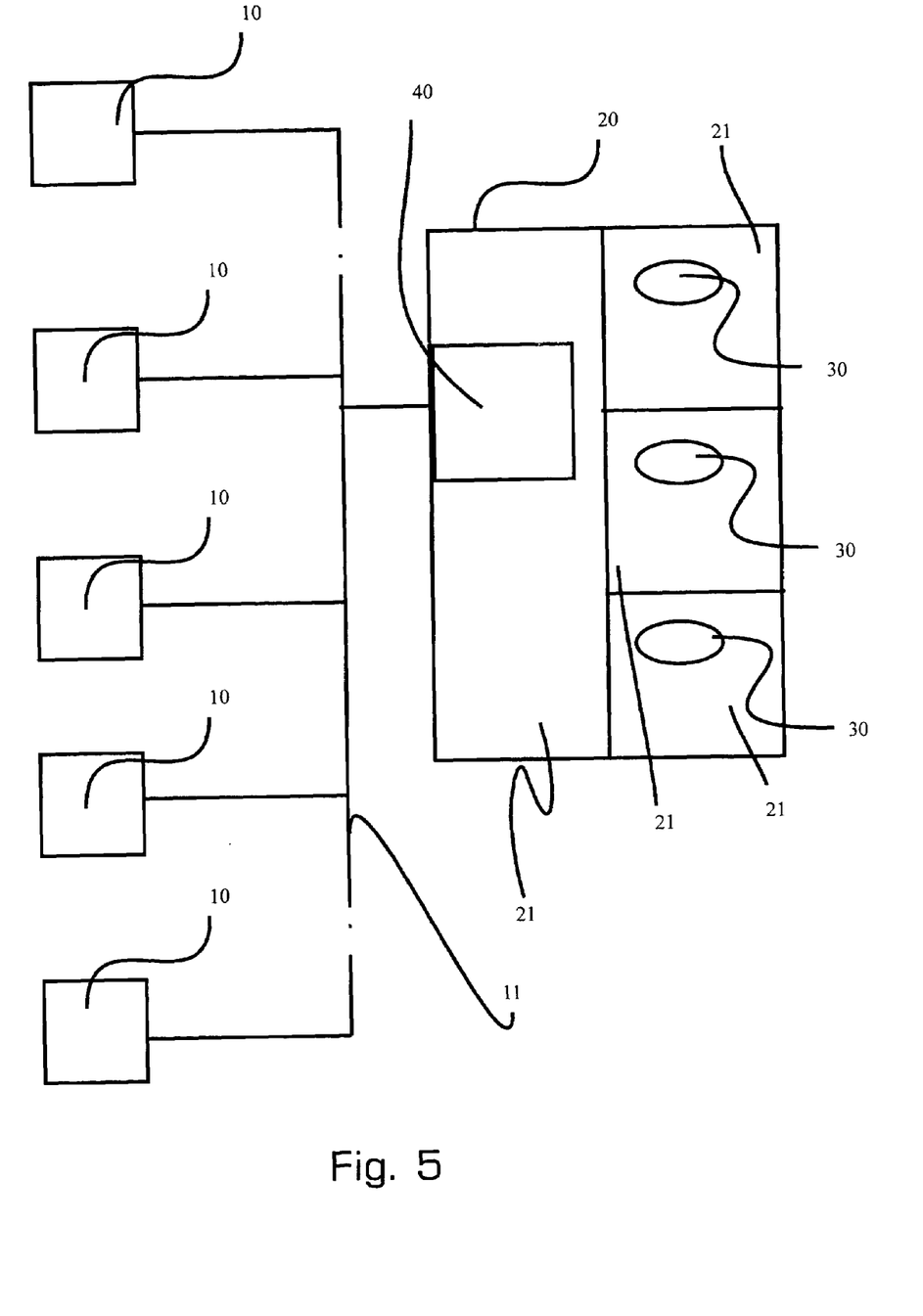
FIG. 5 is a schematic diagram of an embodiment of the present invention shown connected to an interconnected computer network.

As depicted in FIG. 5, the DNS server 40 of mail server domain 20 is configured to recognize that e-mail sent by computer systems 10 via the interconnected computer network 11 to a user-specific sub-domain 21 of the e-mail server domain is legitimately addressed, and is further configured with the information specifying the proper e-mail server 30 which is to receive incoming mail for the specified user. Thus, when a sending e-mail system 10 requests the address of the proper e-mail server for the specified user, the DNS server 40 may respond to the request by providing the address of the proper e-mail server 30 associated with the user encoded in the domain portion of the e-mail address. The sending e-mail system may then send the e-mail in question to the proper receiving e-mail server.

The e-mail server 30 is configured to manage the user-specific sub-domain of the e-mail receiving system, and to create appropriate mailboxes for the specified user, for example, default inbox, trash, and priority mailboxes, among others. The e-mail server may maintain a list of source identifiers for each user managed by the e-mail server.

An e-mail system in accordance with the present invention may utilize a micro-computer, such as an Intel processor-based micro-computer running an Open-BSD, Linux, Unix or Microsoft Windows operating system, containing suitably sized volatile and non-volatile memory sub-systems and utilizing input and output sub-systems, or a similarly configured computer, operatively inter-networked to the Internet. This micro-computer may function generally as a processor for incoming e-mail messages. This e-mail system may utilize a BIND or similar DNS server, and any suitable e-mail server, such as Sendmail or similar SMTP compatible e-mail server. All of the foregoing would necessarily be properly installed and initially configured, as is well understood by those of ordinary skill in the art.

The implementation and operation of the present preferred embodiment of the instant invention may be more readily understood by reference to the following detailed discussion of the steps required to add a new user to the e-mail system in accordance with the instant invention. To do so, an administrator would configure the e-mail receiving system's directory structure, BIND DNS server and Sendmail e-mail server by executing the steps shown in the example of Table 2, below (in this example to add a user named "John Doe"). It will be understood by those of ordinary skill in the art that the system changes executed by the following steps may be effectuated through a variety of means, including but not limited through the use of scripts or programs to alter the necessary files and tables, through the use of any suitable text editor, as well as through the use of programs designed to assist in or automate the process, among others. Likewise, those of ordinary skill in the art readily understand that the directories and directory structure indicated in the example may be altered without departing from the present invention.

TABLE 2

1. Log-in to the server;
2. Authenticate as a "superuser", that is, a user with full system administrator rights;
3. Change to the "/etc" directory by executing at the command prompt: "cd /etc";
4. Open the "master.passwd" file with a text editor, for example, the Pico text editor, by executing at the command prompt: "pico -w master.passwd";
5. Add the new user to the "master.passwd" file by appending to the "master.passwd" file: "johndoe:*:1015:2000::0:0:John Doe:/usr/johndoe:/sbin/nologin";
6. Save the changes to the "master.passwd" file and exit the text editor;
7. Reload the user password database by executing at the command prompt: "pwd_mkdb -p /etc/master.passwd";
8. Change to the "/usr" directory by executing at the command prompt: "cd /usr";
9. Make a directory for the new user by executing at the command prompt: "mkdir jdoe";
10. Copy the default user files into the new users directory by executing at the command prompt: "cp/etc/skel/.* jdoe", where the directory "/etc/skel" contains the default user files;
11. Change the ownership of the new user's directory to the new user by executing at the command prompt: "chown -R jdoe:2000 jdoe"
12. Set the new user's password by executing at the command prompt: "passwd jdoe" and interactively following the resulting informational prompts;
13. Change to the "/etc/namedb" directory by executing at the command prompt: "cd /etc/namedb";
14. Open the BIND domain database with a text editordb.pancakemail";
15. Edit the serial number in the BIND domain database file;
16. Add an entry to the BIND domain database file for the new user;
17. Save the changes to the BIND domain database file;
18. Open the BIND main configuration file using a text editor, for example, the Pico text editor, by executing at the command prompt: "pico -w named.conf";
19. Scroll down and add an entry for the new user;
20. Save the changes to the BIND main configuration file;
21. Restart the BIND server by executing at the command prompt: "rndc reload";
22. Review the system log for errors by executing at the command prompt: "tail/var/log/messages";
23. Change the directory to "etc/mail" by executing at the command prompt: "cd /etc/mail":
24. Open the "virtusertable" file using a text editor, for example, the Pico text editor, by executing at the command prompt: "pico -w virtusertable";
25. Add the default entries for the new user;
26. Save the changes to the "virtusertable" file;
27. Open the local-host-names file using a text editor, for example, the Pico text editor, by executing at the command prompt: "pico -w local-host-names";
28. Add an entry for the new user;
29. Save the changes to the "local-host-names" file;
30. Apply changes to the Sendmail server by executing the following commands in sequence at the system command prompt:
    "#!/bin/csh"
    "makemap hash /etc/mail/access < /etc/mail/access"
    "makemap hash /etc/mail/domaintable < /etc/mail/domaintable"
    "makemap hash /etc/mail/genericstable < /etc/mail/genericstable"
    "makemap hash /etc/mail/virtusertable < /etc/mail/virtusertable/usr/bin/newaliases"
    "kill -HUP 'ps waux | grep 'sendmail: acc' | grep -v grep | awk '{print $2}'`"
    "sleep 1"
    "tail/var/log/maillog"
31. Confirm the account configuration by successfully sending the new user a test e-mail TABLE 2-continued from another server.

Figure 6:
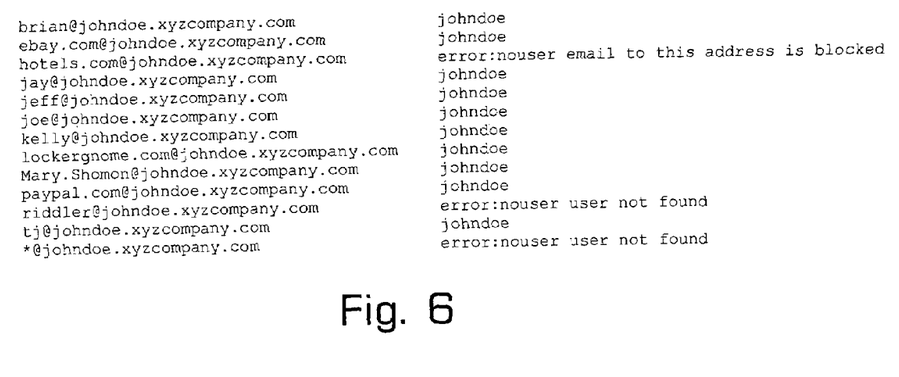
FIG. 6 is a detailed listing of an exemplary "virtusertable" from an implementation of a preferred embodiment of the present invention.
Figure 7:
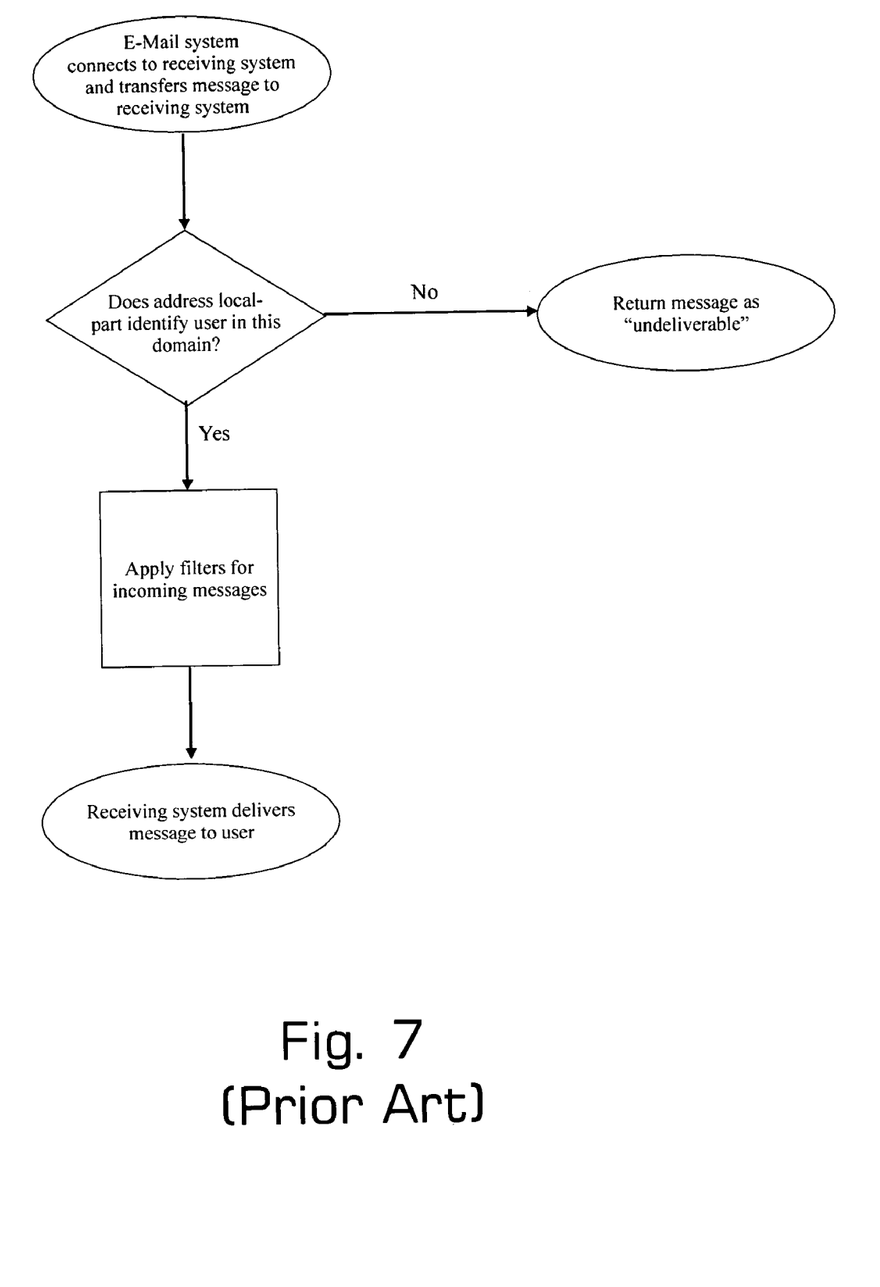
FIG. 7 is a flow chart depiction of typical e-mail message processing in prior art e-mail systems.
Figure 8:
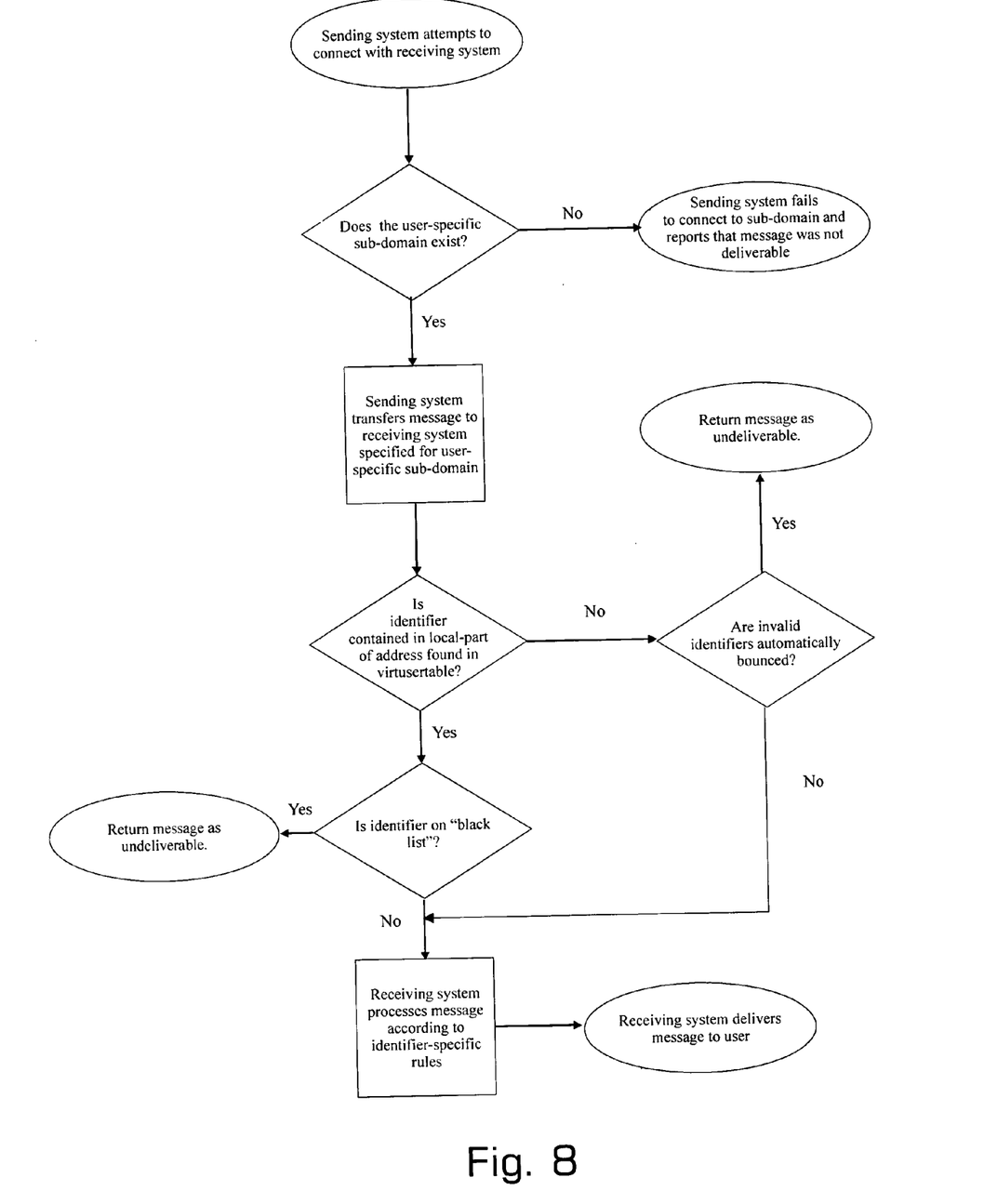
FIG. 8 is a flow chart depiction of e-mail message processing of a preferred embodiment of the present invention.

The aforementioned "virtusertable" may be a tab delimited text database which specifies e-mail address processing instructions based in part on source identifiers contained in e-mail addresses. The format for this text database may be as follows:

```
[e-mail address][tab][mailbox, alias or error][CR]
[e-mail address][tab][mailbox, alias or error][CR]
[e-mail address][tab][mailbox, alias or error][CR]
<any number of additional lines in the same format>
``` where "e-mail address" includes local-parts and domain parts of the address, and "mailbox, alias or error" identifies the mailbox or alias to which messages addressed to specified e-mail address are to be delivered, or, alternatively, the error to generate for messages delivered to the specified e-mail address. Other processing instruction file formats may be equally suitable, as will be readily apparent to those of ordinary skill in the art.

Other methods for adding, removing or otherwise altering users and source identifiers will be readily apparent to those of ordinary skill in the art. Such processes may be automated through the use of programs or scripts, including PERL scripts among others, and the foregoing administrative functionality may be incorporated into administrator tools in the form of programs, web based interfaces and the like.

The instant invention allows for a domain's users' e-mail to be distributed among multiple e-mail servers at the discretion of the administrator. By incorporating the username into the domain portion of the message address, a DNS server will treat the entry as a distinct domain. Thus, different users' sub-domains may be mapped by a DNS server to different physical servers, thereby allowing greater flexibility in e-mail system implementation and management.

While particular embodiments of the present invention have been shown and described, it will be apparent to those skilled in the pertinent art that changes and modifications may be made without departing from the invention in its broader aspects.

What is claimed is:

1. A method for processing an electronic mail message, comprising the steps of:

(a) accepting a request for e-mail server address information for an electronic message, said electronic message having an address, said address having an electronic mail receiving system domain with a recipient name encoded therein, said address further including a source identifier, and said address further including a local-part, said source identifier being encoded in said local-part;

(b) providing an e-mail server address for said recipient name in response to said request;

(c) accepting said electronic message at said e-mail server address;

(d) retrieving said source identifier from said local-part of said address and examining the source identifier included in said address;

(e) processing said electronic message based on processing instructions associated with said source identifier;

(f) opening a database;

(g) determining if an entry associated with said source identifier exists in said database;

(h) if said entry exists, processing said electronic message in accordance with processing instructions contained in said entry;

(i) if said entry does not exist, processing said electronic message in accordance with a default processing instruction.

2. The method of claim 1, wherein said recipient name is a sub-domain of said electronic mail receiving system domain, and wherein said step of providing an e-mail server address includes the steps of:

(a) obtaining sub-domain address information for said sub-domain of said electronic mail receiving system domain;

(b) providing said sub-domain address as said e-mail server address.

3. The method of claim 2, wherein said step of obtaining said sub-domain address information includes the steps of requesting an address from a DNS server and receiving a sub-domain address from said DNS server in response to said request.

* * * * *